United States Patent [19]

Burghardt et al.

[11] Patent Number: 4,607,805

[45] Date of Patent: Aug. 26, 1986

[54] SAFETY BELT EMERGENCY LOCKING RETRACTOR

[75] Inventors: Wilfried Burghardt, Altomuenster; Hans-Hellmut Ernst, Sulfeld; Josef Mayer, Weichs, all of Fed. Rep. of Germany

[73] Assignee: Britax-Kolb GmbH & Co., Dachau, Fed. Rep. of Germany

[21] Appl. No.: 710,006

[22] Filed: Mar. 11, 1985

[30] Foreign Application Priority Data

Mar. 13, 1984 [GB] United Kingdom ............... 8406493

[51] Int. Cl.$^4$ ............................................. B60R 22/40
[52] U.S. Cl. ............................................. 242/107.4 A
[58] Field of Search ............... 242/107.4 A, 107.4 B, 242/107.4 C, 107.4 D, 107.4 E, 107.4 R; 280/806; 297/478, 480

[56] References Cited

U.S. PATENT DOCUMENTS 3,348,789 10/1967 Hirsch .................. 242/107.4 D
4,083,511 4/1978 Ikesue .................. 242/107.4 A
4,522,350 6/1985 Ernst .................... 242/107.4 A Primary Examiner—John M. Jillions
Attorney, Agent, or Firm—Hayes, Davis & Soloway

[57] ABSTRACT

An emergency locking retractor for a vehicle safety belt has a spool rotatably mounted on a frame, primary locking means arranged to block rotation of the spool relative to the frame and secondary locking means for actuating the primary locking means. The secondary locking means including an inertia sensor and a pawl pivotally mounted on a carrier which is movable relative to the frame, the pawl being movable by the inertia sensor into simultaneous engagement with a stop member on the carrier and a ratchet wheel coupled to the spool so that subsequent rotation of the spool of the belt protraction direction causes movement of the carrier which in turn actuates the primary locking means. The stop member is so positioned relative to the pivotal mounting thereof that the pawl comes into abutment with the stop member before its pawl tip abuts against the periphery of the ratchet wheel between adjacent teeth thereof.

6 Claims, 4 Drawing Figures

SAFETY BELT EMERGENCY LOCKING RETRACTOR

This invention relates to an emergency locking retractor for a vehicle safety belt of the type comprising a pair mutually parallel frame members, a spool, for receiving the belt, mounted for rotation relative to the frame members, primary locking means arranged to block rotation of the spool relative to the frame members and secondary locking means for actuating the primary locking means, the secondary locking means including an inertia sensor and a pawl pivotally mounted on a carrier which is movable relative to the frame members, the pawl being movable by the inertia sensor into simultaneous engagement with a stop on the carrier and a ratchet wheel coupled to the spool so that subsequent rotation of the spool of the belt protraction direction causes movement of the carrier which in turn actuates the primary locking means. A retractor of this type is disclosed in our patent application Ser. No. 551,946, now U.S. Pat. No. 4,522,350 the stop on the carrier serving to relieve the load on the pivot of the pawl.

Accurate operation of the locking mechanisms of retractors of this type is critically dependent on the dimensions of the components of the secondary locking means. Since these components are commonly made of plastics material, they are liable both to breakage if a sudden excessive load is applied and to creep (permanent plastic deformation) under steady loads, particularly when operated at high ambient temperatures. The present invention provides an emergency locking retractor in which the secondary locking means is constructed so as to minimize these disadvantages.

According to the invention, an emergency locking retractor of the foregoing type has the stop member for the pawl so positioned relative to the pivotal mounting thereof that the pawl comes into abutment with the stop member before its pawl tip abuts against the periphery of the ratchet wheel between adjacent teeth thereof.

This arrangement reduces the risk of the pawl tip being damaged or worn away in use thereby delaying the instant at which movement of the pawl towards the ratchet wheel causes it to come into engagement.

Preferably, in order to ensure that tip-to-tip engagement between the pawl and one of the teeth of the ratchet wheel results in the pawl moving into full engagement, the angle between a line joining the pivot axis of the pawl and its tip when fully engaged and the adjacent tangent to the periphery of the ratchet wheel is at least 25 deg.

The force tending to pull the pawl from a position of tip-to-tip engagement into a position of full engagement can be further increased by inclining the engagement faces of the teeth of the ratchet wheel at an angle of at least 15 degrees to their adjacent radii so that the tips of the ratchet teeth overhang the radially inner ends of the corresponding engagement faces.

U.S. Pat. No. 4,522,350 also discloses the provision of hold-off means arranged to press the pawl into engagement with the inertia sensor when the force applied to the safety belt by the user's body is less than the retraction force applied thereto by the retractor, the object being to prevent rattling of the various parts of the mechanism. According to a feature of the invention, stop means are provided to limit the extent of deformation of the components of the inertia sensor which can be caused by the force exerted by the hold-off means. The stop means may be arranged to engage with the pawl adjacent to its point of contact with an output member of the inertia sensor. Alternatively, the stop means may be arranged to engage with such output member adjacent to its point of contact with the pawl.

Two embodiments of the invention will now be described, by way of example, with reference to the accompanying drawings in which.

Figure 1:
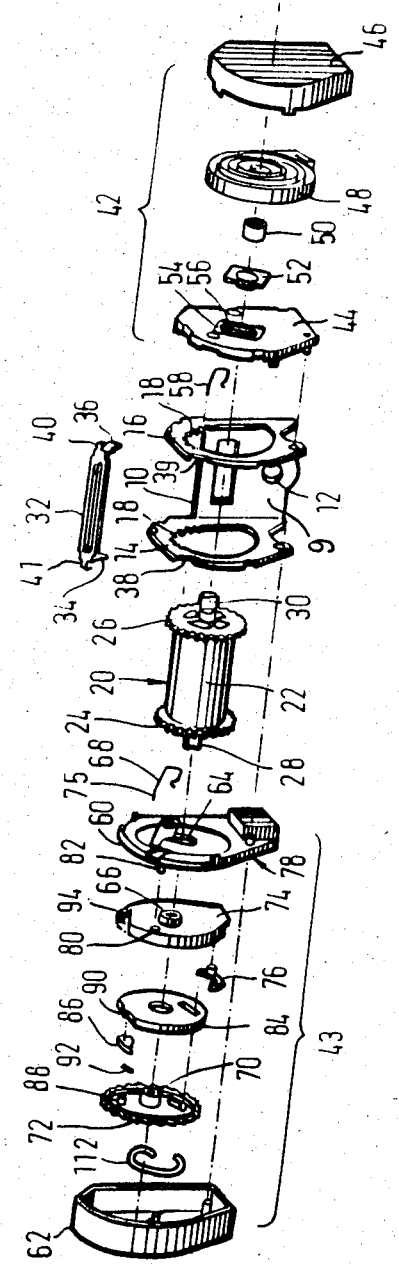
FIG. 1 is an exploded perspective view of an emergency locking retractor in accordance with a first embodiment of the invention.

The retractor illustrated in FIG. 1 has a generally U-shaped frame 10, the base portion 9 of which is provided with a hole 12 whereby the frame 10 may be secured to the body of a motor vehicle. The side limbs of the U-shape constitute substantially identical frame members 14 and 16 each of which contains an aperture which is generally circular but somewhat enlarged in the vertical direction and which has a respective toothed segment 18 forming part of its upper periphery.

A spool 20 is mounted in the frame 10. The spool 20 comprises a central shaft portion 22, on which a safety belt may be wound, two toothed discs 24 and 26, for engagement with the toothed segments 18 on the frame members 14 and 16 respectively, and two projecting stub axles 28 and 30.

A distance bar 32 having perpendicularly projecting side limbs 34 and 36, extends between notches 38 and 39 in the outer edges of the frame members 14 and 16 so as to maintain the required spacing therebetween. The end limbs 34 and 36 project beyond the edges of the openings in the frame members 14 and 16 so as to overlap the toothed discs 24 and 26 of the spool and prevent axial displacement thereof. In addition, the distance bar 32 has respective hook formations 40 and 41 on its two ends which serve to retain a retractor spring cassette 42 in engagement with the outer side face of the frame member 16 and a locking mechanism cassette 43 in engagement with the outer side face of the frame member 14.

The enclosure for the retractor spring cassette 42 comprises an end member 44, which abuts the frame member 16 and is engaged by the hook formation 40, together with a cover 46 which carries a stop (not shown) to which the outer end of a retraction spring 48 is secured. The inner end of the spring 48 is secured to a plastics boss 50 having a cylindrical outer surface and a slotted opening for engagement with the flattened end of the stub axle 30 of the spool. The axial length of the boss 50 is greater than the width of the spring 48 so as to be long enough for one end thereof to project into an opening in a plastics bearing plate 52 which is slidably mounted in an elongate recess 54 in the surface of the end plate 44. Centrally disposed within the recess 54 is an elongate slot 56 through which project the stub axle 30 and a boss on the bearing plate 52. The lengths of the recess 54 and the slot 56 are such that the bearing plate 52 can slide between a position in which the teeth on the disc 26 engage with the toothed segments 18 on the end plate 16 and a position in which they are clear of such engagement. A spring 58 engages with a formation on the bearing plate 52 to bias it into the disengaged position.

The locking mechanism cassette 43 is enclosed by an end plate 60, which abuts the outer face of the frame member 14 and is engaged by the hook formation 41 on the distance bar 32, together with a cover 62. The end plate 60 has an elongate slot 64 and a sliding bearing 66, which is spring biased away from the toothed segments 18 on the end plate 14 by a spring 68, in a similar manner to the corresponding components of the retractor spring cassette 42. However, in the locking mechanism cassette 43, the boss 50 is replaced by a stub axle 70 which is rigidly attached to a ratchet wheel 72, the stub axle 70 having a cylindrical outer surface for engagement in the bearing 66 and a slot for engagement with the flattened end portion of the stub axle 28 of the spool 20.

The sliding bearing 66 is an integral part of a control member 74 which is subject to an angular bias in the belt retraction direction by an extended limb 75 of the spring 68. A pawl 76 is pivotally mounted on the control member 74 so that it can be moved into engagement with the teeth of the ratchet wheel 72 by a conventional ball-in-saucer inertia sensing mechanism 78 mounted on the bottom of the end plate 60. The control member 74 also has a hole 80 by which it is pivotally mounted on a pin 82 secured to the end plate 60.

The locking mechanism cassette 43 also includes a belt-pull-sensitive actuating mechanism which is of conventional type. Briefly, the belt-pull-sensitive locking mechanism consists of an inertia disc 84 which is pivotally mounted on the stub axle 70 of the ratchet wheel 72 and a pawl 86 which is pivotally mounted on a pin 88 secured to one side face of the ratchet wheel 72 adjacent to its periphery. The inertia disc 84 has a pin 90 which engages in a slot in the pawl 86 to cause the latter to move outwardly, if the inertia disc 84 lags behind the ratchet wheel 72, against the action of a spring 92, when the belt is being withdrawn from the spool 20. If the belt is accelerated in the withdrawal direction, the disc 84 has sufficient inertia to overcome the action of the spring 92 with the result that the pawl 86 moves outwardly into engagement with internal ratchet teeth 94 formed on a flange projecting from the control member 74 so that the latter is thereby coupled to the ratchet wheel 72 just as if the inertia sensing mechanism 78 had been actuated.

When the control member 74 is coupled to the ratchet wheel 72, either by the pawl 76 of the inertia sensing mechanism or by the pawl 86 of the belt-pull-sensitive mechanism, continued tension in the safety belt causes the control plate 74 to pivot about the pin 82, the bearings 52 and 66 sliding along the slots 56 and 64 against the action of the springs 58 and 68 until the teeth of the discs 24 and 26 come into engagement with the toothed segments 18 on the frame members 14 and 16. Once pivotal movement of the control plate 74 has commenced, the mechanism will move into and then remain in its fully locked position until tension in the safety belt is removed.

Figure 2:
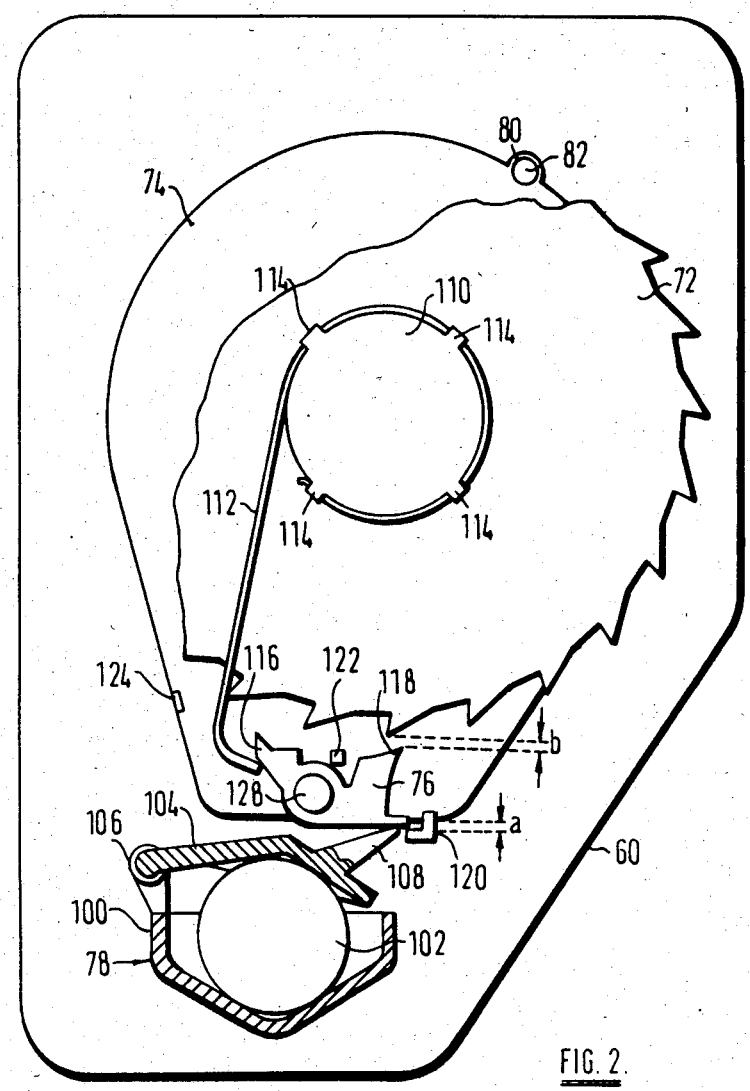
FIG. 2 is a partially broken away side view of the inertia sensor and associated mechanism in its release position.
Figure 3:
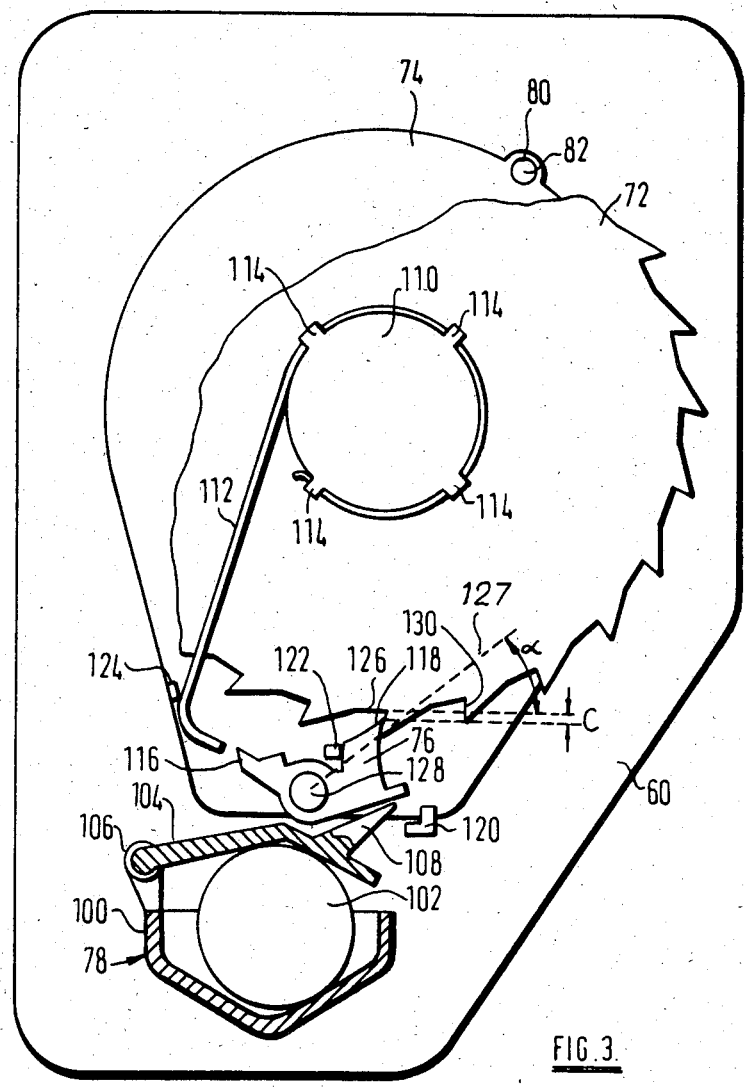
FIG. 3 is a side view, similar to FIG. 2 but showing the mechanism in its engaged position.

FIGS. 2 and 3 show the inertia sensing mechanism 78 and adjacent components in more detail. The ratchet wheel 72 has been broken away to show the pivotal mounting of the control member 74 but the components 84 to 94 of the strap-pull-sensitive mechanism are not shown. It will be seen that the inertia sensing mechanism 78 comprises a carrier 100 which is secured to the end plate 60 and includes a saucer for a ball 102. A ball follower lever 104 is coupled at one end to a pivotal mounting 106 on the carrier 100 and has a projection 108 adjacent to its other end which engages with the pawl 76.

The ratchet wheel 72 has a hub 110 projecting from the opposite side to the stub axle 70 (FIG. 1). A hold-off lever 112, formed from resilient wire has one end wrapped round the hub 110 and retained thereon against axial displacement by lugs 114. Its other end is bent to engage under a heel 116 on the opposite end of the pawl 76 to the pawl tip 118 thereof.

The control member 74 carries three abutment stops 120, 122 and 124. The stops 120 and 122 are disposed on each side of the pawl tip 118 and serve to limit movement of the pawl 76 in the clockwise and anti-clockwise directions respectively. The stop 124 serves to limit anti-clockwise movement of the hold-off lever 112 after it has disengaged from the heel 116 of the pawl 76.

In normal use, after the safety belt attached to the retractor has been put on by a user, the retraction of the slack in the belt causes the ratchet wheel 72 to move in the anti-clockwise direction. The frictional engagement between the hub 110 and lever 112 presses the latter under the heel 116 of the pawl 76, forcing the other end thereof into firm engagement with the projection 108 and thereby pressing the ball follower lever 104 down on to the ball 102 and thus preventing the latter from rattling. There is now a clearance a between the pawl 76 and the stop 120 which is less than the amount by which the distance b between the pawl tip 118 and the tips of the teeth of the ratchet wheel 72 can safely be allowed to increase without unacceptably increasing the magnitude of displacement of the ball 102 which would be necessary to move the pawl 76 into engagement with the ratchet wheel 72. The extent to which the lever 104 can bend, for example as a result of creep due to adverse environmental conditions, is limited to an acceptable value by the stop 120.

Turning now to FIG. 3, if, while the vehicle in which the retractor is fitted is subject to acceleration in the horizontal direction, increased tension in the safety belt causes the ratchet wheel 72 to turn in the clockwise direction, the frictional engagement between the hub 110 and lever 112 will cause the latter to move clear of the heel 116 and into abutment against the stop 124. The pawl 76 is now free to move, permitting lateral displacement of the ball 102 from its central position in the carrier 110 to cause upward movement of the lever 104 and, with it, of the pawl 76. As soon as the tip 118 of the pawl 76 is closer to the axis of the ratchet wheel 72 than the tips of the teeth thereof, any further rotation of the ratchet wheel 72 in the clockwise direction will drag the pawl 76 into further engagement until it abuts against the stop 122, which is positioned to maintain a minimum clearance c between the pawl tip 118 and the periphery 126 of the ratchet wheel 72 between the various teeth thereof, thus avoiding the risk of damage to the pawl tip 118. As can be seen from FIG. 3, the pawl 76 is now out of contact with the projection 108 of the lever 104 with the result that subsequent movement of the ball 102 has no effect on the locking action, the pawl 76 remaining in engagement with the ratchet wheel 72 until tension in the safety belt is relaxed.

It will be observed from FIG. 3 that there is a substantial angle $\alpha$, preferably of at least 25 deg, between the dotted line 127 joining the pawl tip 118 and the pivot axis 128 of the pawl 76 and the adjacent tangent to the periphery 126 of the ratchet wheel 72 at the instant of tip-to-tip engagement with the teeth of the ratchet wheel 72. The effect of this is to enhance the force exerted on the pawl 76 by the teeth of the ratchet wheel 72, moving it into its fully engaged position. The locking action is further enhanced by inclining the locking faces 130 of the teeth of the ratchet wheel at an angle of at least 15 degrees to the adjacent radius thereof.

Figure 4:
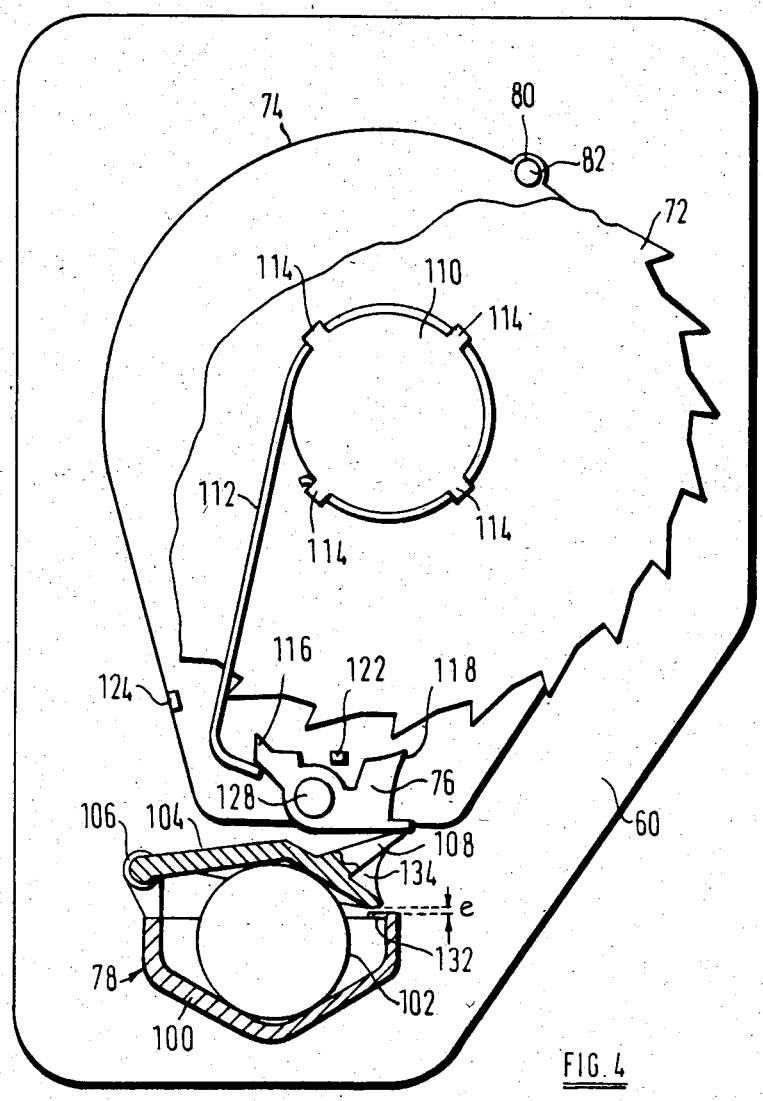
FIG. 4 is a side view, similar to FIG. 2 of a second embodiment of the invention.

FIG. 4 illustrates a second embodiment of the invention which differs from that illustrated in FIG. 2 only in that the stop 120 on the control plate 74 is replaced by a stop 132 mounted on the edge of the carrier 110, which has a clearance e (equal to the clearance a of FIG. 2) from the free end of the ball follower lever 104 when the hold-off lever 112 is urged against the heel 116 of the pawl 76. Since the stop 132 is mounted on the same component as that which carries the pivotal mounting 106 for the lever 104, the accuracy of operation is not affected by the tolerances involved in the mounting of the carrier 100 and the control member 74 on the end plate 60. On the other hand, the stop 132 does not give any protection to the projection 108 which is therefore reinforced with an additional rib 134.

As a further alternative, both stops 120 and 132 may be provided, in which case the clearance a is made somewhat larger than the clearance e. The stop 120 then comes into engagement with the pawl 76 only if the projection 108 is deformed.

It should be emphasized that, in normal use, neither of the stops 120 and 132 is ever engaged by the pawl 76 and the lever 104 respectively.

We claim:

1. An emergency locking retractor for a vehicle safety belt comprising a pair of mutually parallal frame members, a spool, for receiving the belt, mounted for rotation relative to the frame members, primary locking means arranged to block rotation of the spool relative to the frame members and secondary locking means for actuating the primary locking means, the secondary locking means including a ratchet wheel coupled to the spool, an inertia sensor having an output member, a carrier movable relative to the frame members, a stop member mounted on the carrier, a pawl having a pawl tip, a pivotal mounting securing the pawl on the carrier so that the pawl is movable by the output member of the inertia sensor into simultaneous engagement with the stop member and the ratchet wheel whereby subsequent rotation of the spool in the belt protraction direction causes movement of the carrier which in turn actuates the primary locking means, the stop member for the pawl being so positioned relative to the pivotal mounting thereof that the pawl comes into abutment with the stop member before its pawl tip abuts against the periphery of the ratchet wheel between adjacent teeth thereof.

2. A retractor according to claim 1, wherein the angle between a line joining the pivot axis of the pawl and its tip when fully engaged and the adjacent tangent to the periphery of the ratchet wheel is at least 25 deg.

3. A retractor according to claim 1, wherein the engagement faces of the teeth of the ratchet wheel are inclined at an angle of at least 15 degrees to their adjacent radii so that the tips of the ratchet teeth overhang the radially inner ends of the corresponding engagement faces.

4. A retractor according to claim 1, wherein hold-off means are arranged to press the pawl into engagement with the inertia sensor and stop means are provided to limit the extent of deformation of the inertia sensor which can be caused by the force exerted by the hold-off means.

5. A retractor according to claim 4, wherein the stop means are arranged to engage with the pawl adjacent to its point of contact with the output member of the inertia sensor.

6. A retractor according to claim 4, wherein the stop means are arranged to engage with the output member of the inertia sensor adjacent to its point of contact with the pawl.

* * * * *